United States Patent [19]

Claar et al.

[11] Patent Number: 5,066,622
[45] Date of Patent: Nov. 19, 1991

[54] METHOD OF PRODUCING AND MODIFYING THE PROPERTIES OF CERAMIC COMPOSITE BODIES

[75] Inventors: Terry D. Claar, Newark; Gerhard H. Schiroky, Hockessin; Kevin P. Pochopien, Newark, all of Del.

[73] Assignee: Lanxide Technology Company, LP, Newark, Del.

[21] Appl. No.: 554,100

[22] Filed: Jul. 13, 1990

Related U.S. Application Data

[63] Continuation of Ser. No. 137,397, Dec. 23, 1987, abandoned.

[51] Int. Cl.$^5$ ............................................. C04B 35/52
[52] U.S. Cl. ......................................... 501/87; 501/96
[58] Field of Search ................................. 501/87, 96

[56] References Cited

U.S. PATENT DOCUMENTS

| | | |
|---|---|---|
| 2,741,822 | 4/1956 | Udy . |
| 3,255,027 | 6/1966 | Talsma . |
| 3,296,002 | 1/1967 | Hare . |
| 3,298,842 | 1/1967 | Seufert . |
| 3,419,404 | 12/1968 | Mao . |
| 3,421,863 | 1/1969 | Bawa . |
| 3,437,468 | 4/1969 | Seufert . |
| 3,473,938 | 10/1969 | Oberlin . |
| 3,473,987 | 10/1969 | Sowards . |
| 3,789,096 | 1/1974 | Church . |
| 3,864,154 | 2/1975 | Gazza et al. . |
| 3,946,039 | 3/1976 | Walz .................................. 264/59 |
| 3,973,977 | 8/1976 | Wilson . |
| 4,011,291 | 3/1977 | Curry .................................. 264/43 |
| 4,559,244 | 12/1985 | Kaspizyk et al. .................... 501/82 |
| 4,605,440 | 8/1986 | Halverson . |
| 4,702,770 | 10/1987 | Pyzik . |
| 4,713,360 | 12/1987 | Newkirk et al. ..................... 501/98 |
| 4,718,941 | 1/1988 | Halverson . |
| 4,808,558 | 2/1989 | Park et al. ........................... 264/59 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories", -M. Drouzy and M. Richard-Mar. 1974-Fonderie, France, No. 332, pp. 121-128.
"Refractories for Aluminum Alloy Melting Furnaces", -B. Clavaud and V. Jost-Sep. 1980-Lillian Brassinga (from French) Jan. 1985.

*Primary Examiner*—Olik Chaudhuri
*Assistant Examiner*—Andrew Griffis
*Attorney, Agent, or Firm*—Mark G. Mortenson; William E. McShane

[57] ABSTRACT

This invention relates generally to a novel method of manufacturing a composite body. More particularly, the present invention relates to a method for modifying the resultant properties of a composite body, by, for example, minimizing the amount of porosity present in the composite body. Additives such as TaC, ZrC, ZrB$_2$, VC, NbC, WC, W$_2$B$_5$ and/or MoO$_2$B$_5$ can be combined with a boron carbide material which is thereafter reactively infiltrated by a parent metal. The composite body comprises one or more boron-containing compounds (e.g., a boride or a boride and a carbide) which is made by the reactive infiltration of molten parent metal into the boron carbide mass. Particular emphasis is placed upon modifying the properties of a ZrB$_2$-ZrC-Zr composite body. However, the methods disclosed in the application are believed to be generic to a number of parent metals and preform materials.

8 Claims, 1 Drawing Sheet

METHOD OF PRODUCING AND MODIFYING THE PROPERTIES OF CERAMIC COMPOSITE BODIES

This is a continuation of copending application Ser. No. 07/137,397 filed on Dec. 23, 1987 now abandoned.

FIELD OF THE INVENTION

This invention relates generally to a novel method of manufacturing a ceramic composite body, such as a $ZrB_2$-ZrC-Zr composite body (hereinafter referred to as "ZBC" composite body). More particularly the present invention relates to a method for modifying the resultant properties of a ceramic composite body, by, for example, minimizing the amount of porosity present in the composite body. The composite body comprises one or more boron-containing compounds (e.g., a boride or a boride and a carbide) which has been made by the reactive infiltration of a molten parent metal into a bed or mass containing boron carbide, and optionally one or more inert fillers, to form the body. Particular emphasis is placed upon modifying the properties of a ZBC composite body (i.e., reactively infiltrating a mass containing boron carbide with a zirconium parent metal). However, the methods disclosed herein are believed to be generic to a number of different parent metals.

BACKGROUND OF THE INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare dense boride-containing materials.

DISCUSSION OF RELATED PATENT APPLICATIONS

Many of the above-discussed problems associated with the production of boride-containing materials have been addressed in co-pending U.S. patent application Ser. No. 073,533, now abandoned, filed in the names of Danny R. White, Michael K. Aghajanian and T. Dennis Claar, on July 15, 1987, and entitled "Process for Preparing Self-Supporting Bodies and Products Made Thereby". The subject matter of application Ser. No. 073,533 (hereinafter referred to as application '533) is herein expressly incorporated by reference.

The following definitions were used in application '533 and shall apply to the instant application as well.

"Parent metal" refers to that metal (e.g., zirconium) which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium), the metal identified should be read with this definition in mind unless indicated otherwise by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

Briefly summarizing the disclosure of application '533, self-supporting ceramic bodies are produced by utilizing a parent metal infiltration and reaction process (i.e., reactive infiltration) in the presence of boron carbide. Particularly, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of application '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in application '533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time.

The typical environment or atmosphere which was utilized in application '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

However, it has been observed that when a zirconium metal is utilized as the parent metal, the $ZrB_2$-$ZrC$-$Zr$ composites which result have an undesirable amount of porosity located at least in a portion thereof. Thus, it has been necessary to determine the cause of this porosity and provide a solution therefor.

SUMMARY OF THE INVENTION

The present invention has been developed in view of the foregoing and to overcome the deficiencies of the prior art.

The invention provides a method for reducing the amount of porosity present in a composite body. More particularly, the amount of porosity can be reduced by utilizing at least one of two different methods, taken alone or in combination. The first method relates to admixing at least one of tantalum carbide, zirconium carbide, and/or zirconium diboride with a permeable mass of boron carbide material, prior to reactively infiltrating the mass with a parent metal. The second method utilizes a particular zirconium parent metal as the parent metal for forming a ZBC composite body. By reducing the amount of porosity in, for example, a ZBC composite body, the machining required to remove undesirable porosity can be reduced, if not completely eliminated.

Broadly, in accordance with a first feature of the invention, at least one of tantalum carbide (TaC), zirconium carbide (ZrC), and/or zirconium diboride ($ZrB_2$) can be admixed with a $B_4C$ material to form a permeable mass which is to be reactively infiltrated. The abovediscussed additives can be added in an amount of about 5-50 percent by weight. After admixing the raw materials together, they are dry pressed to form a preform, in accordance with the disclosure in application '533.

Still further, in accordance with a second feature of the invention, a zirconium sponge metal containing less than 1000 ppm by weight tin, preferably less than 500 ppm by weight tin, as an alloyed contaminant, can be utilized as a parent metal instead of the parent metal disclosed in application '533, which contained about 1000-2000 ppm, by weight, tin. By utilizing either of the above-broadly disclosed methods, a composite body having a reduced amount of porosity can be formed.

In addition, other additives, alone or in combination, can be admixed with the $B_4C$ material to modify properties of the resultant composite body. Particularly, additives such as VC, NbC, WC, $W_2B_5$ and $Mo_2B_5$ can be combined with the $B_4C$ material in an amount of about 5-50 percent by weight, prior to reactively infiltrating the $B_4C$ material. These additives, as well as those discussed above (i.e., TaC, ZrC and $ZrB_2$), may affect such properties as hardness, modulus of elasticity, density and grain size.

It should be understood that even though the additives discussed above have been referred to by their "pure" chemical formulae, some levels or amounts of impurities may be acceptable, so long as the impurities do not interfere with the processes of the invention or contribute undesirable by-products to the finished material.

Moreover, particular emphasis is placed upon modifying the properties of a ZBC composite body (i.e., reactively infiltrating a mass containing boron carbide with a zirconium parent metal). However, the methods disclosed herein are believed to be generic for a number of different parent metals.

DETAILED DESCRIPTION OF THE PREFERRED EMBODIMENTS

The present invention relates to methods for modifying the mechanical properties of a composite body which is produced by the reactive infiltration of a parent metal into a mass containing boron carbide. For example, by combining at least one additive with a boron carbide material, mechanical properties such as hardness, modulus of elasticity, density, porosity, and grain size can be adjusted. As disclosed in application '533, a boron carbide preform can be prepared by any of a wide range of conventional ceramic body formation methods, including uniaxial pressing, isostatic pressing, slip casting, sedimentation casting, tape casting, injection molding, filament winding for fibrous materials, etc. Additionally, it is disclosed that an initial bonding of the material comprising the preform, prior to reactive infiltration, may occur by such processes as light sintering of the materials, or by use of various organic or inorganic binder materials which do not interfere with the process or contribute undesirable by-products to the finished material. It has been discovered that by combining at least one material from the following group of materials (i.e., additives) with the boron carbide material, a modification of the properties of the resultant composite body can occur. Additives such as TaC, ZrC, $ZrB_2$, VC, NbC, WC, $W_2B_5$ and/or $Mo_2B_5$ can be combined with the boron carbide material and can be shaped or formed to result in a preform which has sufficient shape integrity and green strength; is permeable to the transport of molten metal; preferably has a porosity of between about 5-90 percent by volume, and more preferably has a porosity between about 25-75 percent by volume. It is further disclosed that other materials, such as silicon carbide, titanium diboride, alumina and aluminum dodecaboride, can be combined with the boron carbide preform. These materials can also be utilized in the present invention as filler materials, so long as they do not adversely impact resultant mechanical properties of the composite body or the processing of the composite body.

Figure 1:
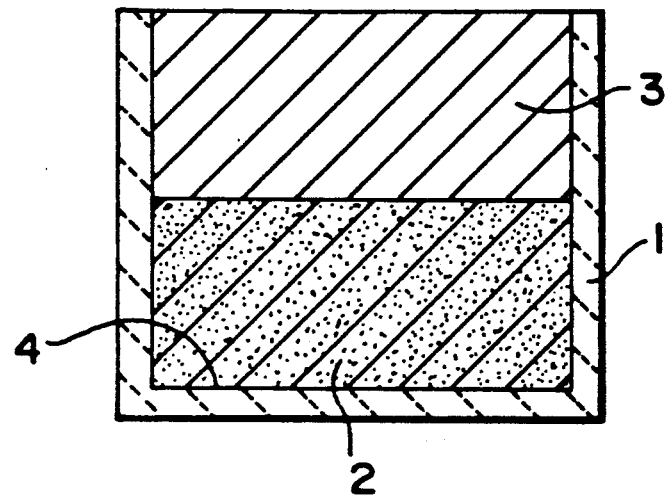
FIG. 1 is a schematic elevational view in cross-section showing a modified $B_4C$ preform 2 in contact with an ingot of zirconium parent metal 3, both of which are contained within a refractory vessel 1.

By following the general processing procedures set forth in application '533, and by utilizing a setup in accordance with FIG. 1 herein, it has been discovered that the amount of porosity in a composite body can be reduced (i.e., a greater density can be achieved). Specifically, by admixing about 5-50 percent by weight of any one of TaC, ZrC, or $ZrB_2$, having a purity level of at least about 99%, with a boron carbide material and a suitable binder material, such as an organic or an inorganic binder, and forming a preform in accordance with the methods set forth in application '533, and thereafter reactively infiltrating a molten zirconium metal into the boron carbide preform, the amount of porosity in a resultant ZBC composite body, relative to a ZBC composite body which does not utilize the aforementioned filler materials, is reduced.

The following are examples of a first aspect of the present invention. The examples are intended to be illustrative of various aspects of the effects of adding any one of TaC, ZrC, or $ZrB_2$ to a boron carbide material prior to reactively infiltrating a zirconium parent metal thereinto.

EXAMPLES 1-3

A preform of boron carbide measuring 1-inch in diameter and ⅜-inch thick was made by admixing about 85 percent by weight $B_4C$ (1000 grit from ESK), about 5 percent by weight organic binder (Acrawax-C from Lonza, Inc.) and about 10 percent by weight TaC (from Atlantic Equipment Engineers). The admixture was placed in a steel die and dry pressed at a pressure of about 2000 psi. As shown in FIG. 1, the preform 2 was placed in a bottom portion of a graphite refractory vessel 1 (made from Grade ATJ graphite from Union Carbide) and placed in contact with an ingot of zirconium parent metal 2 (Grade 702 Zr alloy from Teledyne Wah Chang Albany). The graphite refractory vessel, together with its contents, was placed in a controlled atmosphere-resistance heated furnace. The atmosphere in the furnace was argon, the argon being from Matheson Gas Products, Inc. The furnace was first evacuated at room temperature to a pressure of $1 \times 10^{-2}$ Torr and thereafter backfilled with argon. The furnace was then evacuated to a pressure of about $1 \times 10^{-2}$ Torr and thereafter heated from about room temperature to a temperature of about 250° C. over a period of about 30 minutes. The furnace was thereafter heated from about 250° C. to about 450° C., at a rate of 100° C. per hour. The furnace was again backfilled with argon which remained flowing at a rate of about 0.5 liter per minute and was maintained at a pressure of about 2 psi. The furnace was heated to a temperature of about 1950° C. over a two-hour period and then held at about 1950° C. for about two hours. The furnace was then cooled for about five hours. After cooling, the formed ZBC composite was removed from the furnace.

The resulting ZBC composite body was examined, and it was discovered that the amount of porosity in the bottom one-fourth of the ZBC composite body (i.e., the portion of the body which was initially the most distant from the ingot of parent metal) had been reduced relative to the amount of porosity in ZBC composites produced by an identical method (i.e., all steps were identical, except for the presence of TaC in the preform). Stated in greater detail, the ZBC composite bodies produced without incorporating TaC into the preform typically exhibited a substantial amount of porosity at an interface 4 between the bottom surface of the preform 2 and the refractory vessel 1. However, such porosity was substantially completely eliminated by practicing the methods according to the present invention.

The procedures set forth above were followed exactly, except that rather than utilizing TaC as an additive, ZrC and $ZrB_2$ were used as additives to the boron carbide preform. Particularly, each of ZrC and $ZrB_2$ (also obtained from Atlantic Equipment Engineers) was individually added to the boron carbide material forming the preform in an amount of about 10 percent by weight. After following the processing steps set forth in Example 1 above, it was observed that the porosity in the resultant ZBC composite bodies was substantially completely eliminated.

A second aspect of the present invention relates to substantially completely eliminating the porosity which occurs at an interface between a boron carbide preform and a graphite refractory vessel by using a different parent metal zirconium alloy than that used in the above examples and that used in application '533. Particularly, the above examples and application '533 disclose the use of a commercially available Grade 702 zirconium alloy. However, it has been unexpectedly discovered that the use of the Grade 702 alloy can be detrimental to the resultant ZBC composite body because the Grade 702 alloy contains about 0.1-0.2 weight percent tin (i.e., 1000-2000 ppm by weight tin). The presence of tin in these amounts has been discovered to be undesirable because it appears that, as the $B_4C$ preform is reactively infiltrated by the Grade 702 parent metal alloy, the zone of metal at the infiltration front becomes enriched in tin. This zone or layer of tin-rich metal accumulates at or adjacent to the interface which exists between the bottom of the $B_4C$ preform and the graphite refractory vessel (i.e., at or adjacent to the interface 4 in FIG. 1). It appears that this layer of tin volatilizes at the interface 4, resulting in porosity in the ZBC composite body. This problem can be ameliorated by utilizing a zirconium sponge parent metal containing less than 1000 ppm by weight tin, preferably less than 500 ppm by weight tin. Thus, by utilizing a parent metal of zirconium sponge from Teledyne Wah Chang Albany, having a tin content of about 200 ppm, the amount of porosity produced at the interface 4 is substantially completely eliminated. Thus, the added costs of grinding or machining can be eliminated.

The following is an example of the second aspect of the present invention. The example is intended to be illustrative of various aspects of the effect of utilizing a zirconium sponge parent metal for reactively infiltrating the boron carbide preform.

EXAMPLE 4

A boron carbide preform was manufactured according to the steps set forth in Example 1-3. However, the composition of the preform was about 95 percent by weight boron carbide and about 5 percent by weight organic binder (Acrawax C from Lonza, Inc.).

Figure 2:
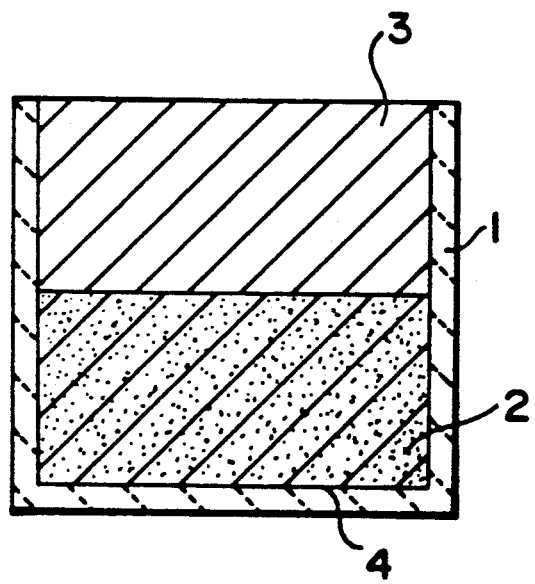
FIG. 2 is a schematic elevational view in cross-section showing a $B_4C$ preform 2 in contact with a zirconium sponge parent metal 3, both of which are contained within a refractory vessel 1.

As shown in FIG. 2, the boron carbide preform 2 was placed in a bottom portion of a graphite refractory vessel 1 and the boron carbide preform 2 was placed in contact with a zirconium sponge parent metal 3. The graphite refractory vessel, together with its contents, was placed in a closed atmosphere-resistance heating furnace. The atmosphere in the furnace was argon, the argon being from Matheson Gas Products, Inc. The furnace was first evacuated at room temperature to a pressure of $1 \times 10^{-2}$ Torr and thereafter backfilled with argon. The furnace was then evacuated to a pressure of about $1 \times 10^{-2}$ Torr and thereafter heated from about room temperature to a temperature of about 250° C. over a period of about 30 minutes. The furnace was thereafter heated from about 250° C. to about 450° C., at a rate of 100° C. per hour. The furnace was again backfilled with argon which remained flowing at a rate of about 0.5 liter per minute and was maintained at a pressure of about 2 psi. The furnace was heated to a temperature of about 1950° C. over a two-hour period and then held at about 1950° C. for about two hours. The furnace was then cooled for about five hours. After cooling, the formed ZBC composite was removed from the furnace.

The resulting ZBC composite body was examined, and it was discovered that the amount of porosity in the ZBC composite body had been reduced relative to the amount of porosity in ZBC composites produced by an identical method, except for the use of a Grade 702 zirconium alloy. Stated in greater detail, the ZBC composite bodies produced by using a Grade 702 zirconium alloy typically exhibited a substantial amount of porosity at the interface between the preform 2 and refractory vessel 1 at the interface designated 4. However, such porosity was substantially completely eliminated by utilizing a zirconium sponge parent metal having a relatively low tin content.

While the present invention has been disclosed in its preferred embodiments, it is to be understood that the invention is not limited to the precise disclosure contained herein, but may otherwise be embodied in various changes, modifications, and improvements which may occur to those skilled in the art, without departing from the scope of the invention, as defined in the appended claims.

We claim:

1. A method of producing a self-supporting body comprising:
   selecting a parent metal;
   heating said parent metal in a substantially inert atmosphere to a temperature above its melting point to form a body of molten parent metal and contacting said body of molten parent metal with a mass comprising boron carbide and at least one additive contained within said mass and selected from the group consisting of tantalum carbide, zirconium carbide, and zirconium diboride;
   maintaining said temperature for a time sufficient to permit infiltration of said molten parent metal into said mass and to permit reaction of said molten parent metal with said boron carbide to form at least one parent metal boron-containing compound; and
   continuing said infiltration reaction for a time sufficient to react said boron carbide substantially completely to produce said self-supporting body comprising at least one parent metal boron-containing compound, said self-supporting body containing an amount of porosity which is less than the amount of porosity which would be contained in a self-supporting body produced by an identical method but without said at least one additive.

2. The method according to claim 1, wherein said at least one additive is present in said mass comprising boron carbide in an amount of about 5-50 percent by weight.

3. The method according to claim 1, wherein said at least one additive is present in said mass comprising boron carbide in an amount of about 10 percent by weight.

4. A method of producing a self-supporting body comprising:
   selecting a zirconium sponge parent metal;
   heating said zirconium sponge parent metal in a substantially inert atmosphere to a temperature above its melting point to form a body of molten parent metal and contacting said body of molten parent metal with a mass comprising boron carbide;
   maintaining said temperature for a time sufficient to permit infiltration of said molten parent metal into said mass and to permit reaction of said molten parent metal with said boron carbide to form at least one parent metal boron-containing compound; and
   continuing said infiltration reaction for a time sufficient to react said boron carbide substantially completely to produce said self-supporting body comprising at least one parent metal boron-containing compound, said self-supporting body containing an amount of porosity which is less than the amount of porosity which would be contained in a self-supporting body produced by an identical method but without using said zirconium sponge parent metal.

5. The method according to claim 4, wherein said zirconium sponge parent metal contains less than about 1000 ppm by weight tin.

6. The method according to claim 4, wherein said zirconium sponge parent metal contains less than about 500 ppm by weight tin.

7. The method according to claim 4, wherein said zirconium sponge parent metal contains about 200 ppm by weight tin.

8. A method of producing a self-supporting body comprising:

selecting a zirconium parent metal which contains less than about 1000 ppm by weight tin;

heating said parent metal in a substantially inert atmosphere to a temperature above its melting point to form a body of molten parent metal and contacting said body of molten parent metal with a mass comprising boron carbide and at least one additive contained within said mass and selected from the group consisting of tantalum carbide, zirconium carbide, and zirconium diboride, said additives being present in said mass in an amount of about 5-50 percent by weight;

maintaining said temperature for a time sufficient to permit infiltration of said molten parent metal into said mass and to permit reaction of said molten parent metal with said boron carbide to form at least one parent metal boron-containing compound; and continuing said infiltration reaction for a time sufficient to react said boron carbide substantially completely to produce said self-supporting body comprising at least one parent metal boron-containing compound, said self-supporting body containing an amount of porosity which is less than the amount of porosity which would be contained in a self-supporting body produced by an identical method but without said at least one additive.

* * * * *